Sept. 13, 1932.  E. L. BEECHER  1,876,552
SHOCK ABSORBER
Filed March 17, 1931   3 Sheets-Sheet 1

Inventor
Eugene L. Beecher,
By Hull, Brock & West,
Attorneys

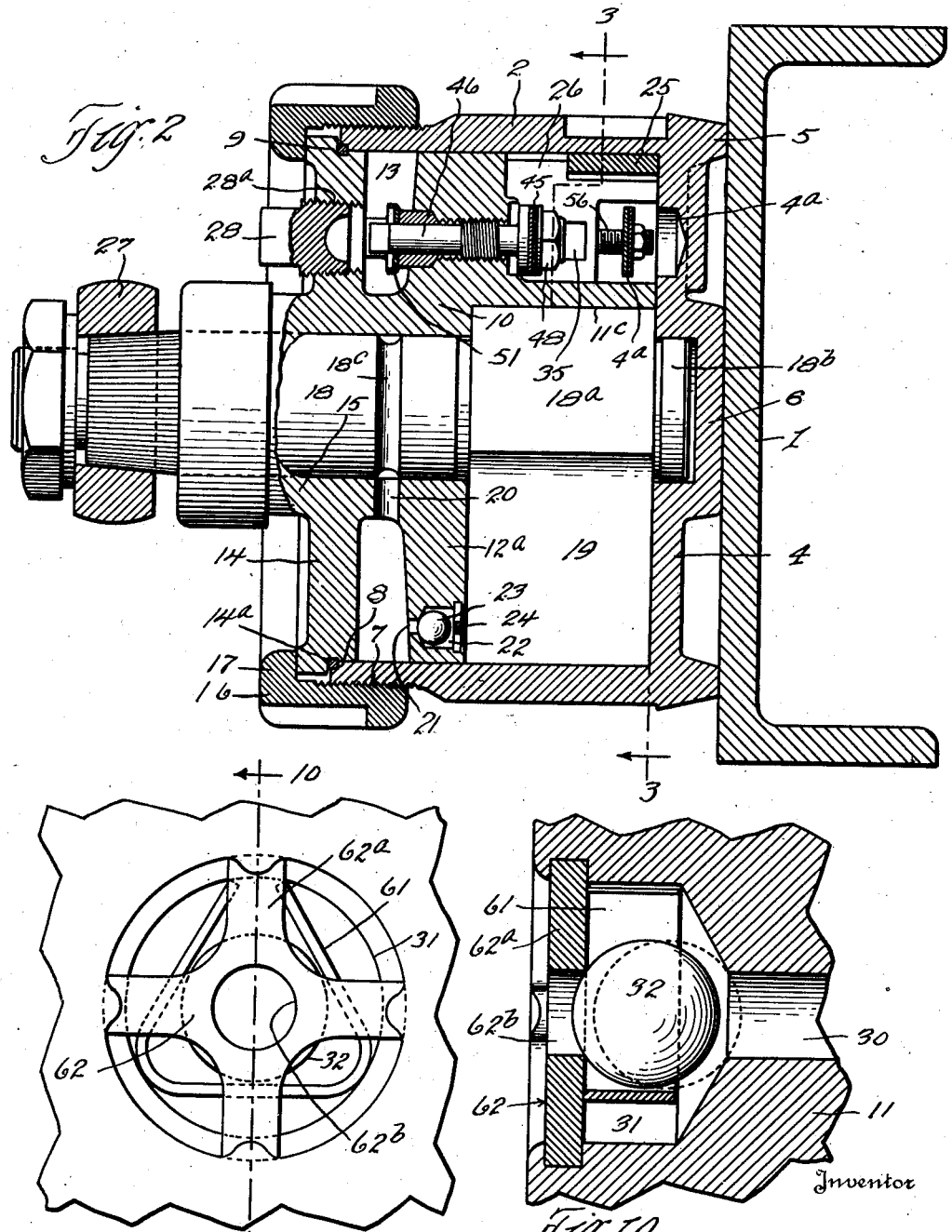

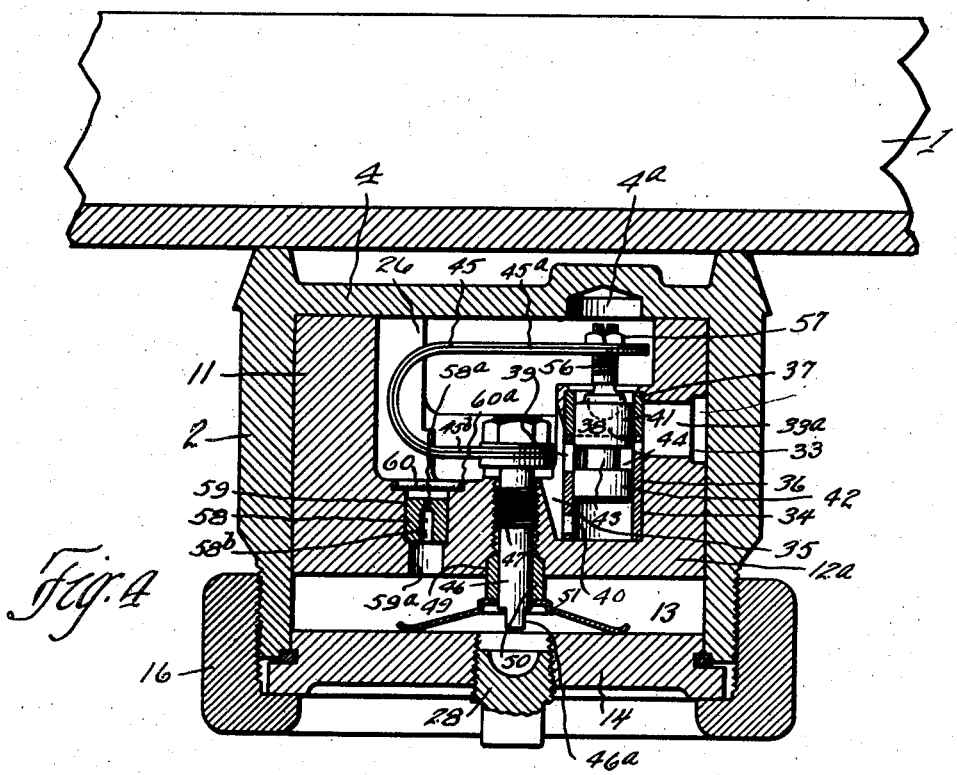

Patented Sept. 13, 1932

1,876,552

UNITED STATES PATENT OFFICE

EUGENE L. BEECHER, OF EAST CLEVELAND, OHIO, ASSIGNOR TO THE GABRIEL COMPANY, OF CLEVELAND, OHIO, A CORPORATION OF OHIO

SHOCK ABSORBER

Application filed March 17, 1931. Serial No. 523,290.

This invention relates to shock absorbers, and more particularly to hydraulic shock absorbers of the type shown in my application No. 494,336, filed November 8, 1930.

One of the objects of the invention is to provide a hydraulic shock absorber with a particularly efficient means for the thermostatic control of the by-pass port by which the liquid passes from one side to the other of the working chamber, whereby the resistance offered to the movement of the piston in said chamber by the liquid therein will be constant irrespective of wide variations in temperature. A further object of the invention is to provide means which will eliminate noise incidental to the movements of the check valve which permits the flow of liquid from one side or end of the working chamber to the other under impact movements of the piston and which prevents such flow under rebound movements of such piston.

Figure 1:
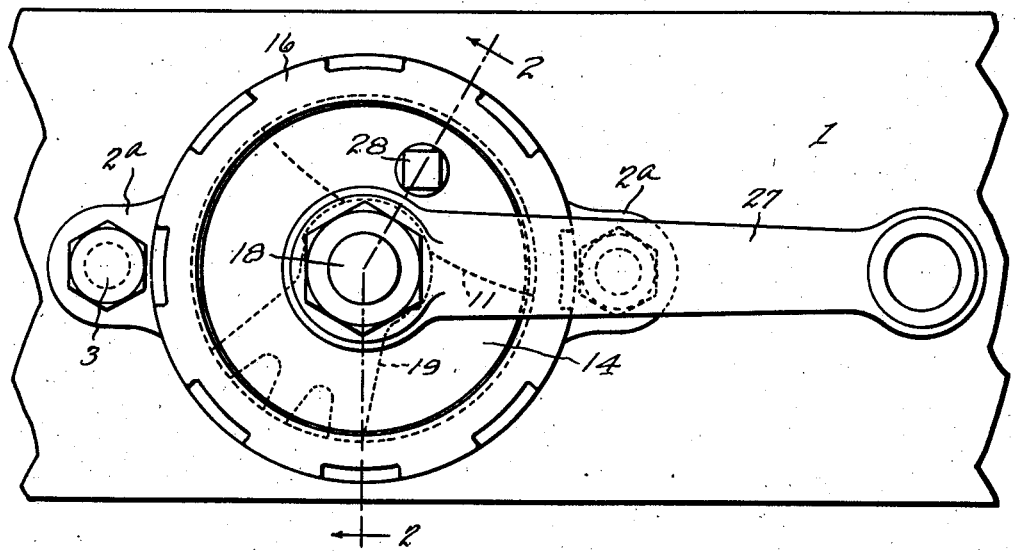
Figure 3:
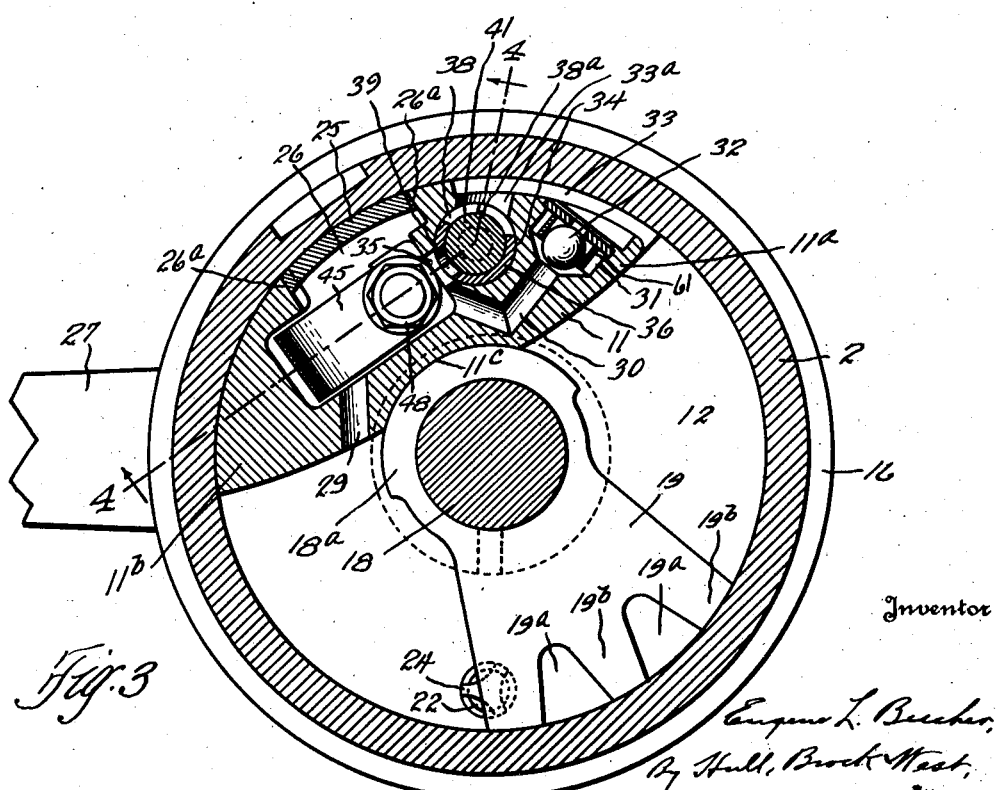

Further and more limited objects of the invention will appear hereinafter and will be realized in and through the construction and arrangement of parts shown in the drawings hereof, wherein Fig. 1 represents a front elevation of a shock absorber constructed in accordance with my invention, showing the same mounted upon one of the side members of a vehicle; Fig. 2 is a longitudinal sectional view through the shock absorber, taken on the line 2—2 of Fig. 1; Fig. 3 a transverse sectional view taken on the line 3—3 of Fig. 2 and Fig. 4 a sectional view taken on the line 4—4 of Fig. 3; Fig. 5 a sectional elevation of the thermostatic valve; Fig. 6 a detail in perspective of the sleeve for the valve proper; Fig. 7 a plan view and Fig. 8 a side elevation of the frictional washer employed in the assembly shown in Fig. 5; Fig. 9 a detail in elevation of the check valve and its mounting which are located in the rebound side of the partition which is interposed between the ends of the working chamber; and Fig. 10 a sectional view corresponding to the line 10—10 of Fig. 9.

Describing the various parts herein by reference characters, 1 denotes one of the side members of an automobile to which my shock absorber is secured by means of lugs 2ª projecting from the rear or base of the cylindrical casing 2, the plugs being secured to the said side member by means of bolts 3. The casing is preferably made as a forging and comprises an integral bottom 4 having a circular peripheral flange 5 and a central hub 6 adapted to engage the side member 1 when clamped thereto by the bolts 3. The opposite or front end of the casing 2 is provided with an external thread 7 and with an annular groove 8 extending around the front of the inner edge thereof, which groove is adapted to receive part of a packing ring 9. 10 denotes generally what may be termed a filler-block for the casing which, when fitted within the casing, provides with the latter a fixed partition 11 within the working chamber 12, a cover 12ª for said working chamber, a reservoir or replenishing chamber 13 for the working chamber, a cover 14 for the latter chamber, and an extended bearing 15 for the shaft. The filler block is of the same general construction as shown, described and claimed in my aforesaid application. It is secured within the casing 2 by means of a locking ring 16 which is threaded onto the outer or front end of the casing and which is provided with an inwardly extending flange 17 adapted to engage the front or outer end of the block 10 and force the same to its seat. The cover 14 is provided with an annular groove 14ª within which and the groove 8 the packing ring 9 is fitted and which ring is compacted by setting up the locking ring 16.

The partition 11 is in the general shape of the segment of a cylinder, extending across the casing between the enlarged hub like portion 18ª of the shaft 18 and the inner cylindrical wall of the casing. This segmental partition is provided with a central cylindrical surface 11ᶜ which is engaged by the hub portion 18ª of the shaft, the shaft being provided with a vane 19 which may be formed with a plurality of pockets 19ª in the outer end thereof, the outer end portions 19ᵇ of the vane being cylindrical and being in close proximity to the inner cylindrical surface of the casing 2. The rear end 18ᵇ of the shaft is mounted in the hub portion 6 of the base of the casing; and the shaft is shown as provided with an annular collecting groove 18ᶜ between the working chamber and the cover 14, which annular collecting groove communicates with the replenishing chamber 13 by a port 20. Voids in the working chamber are replenished from the chamber 13 by means of a port 21 communicating with the replenishing chamber, a chamber 22 which communicates with the port and with the working chamber, and a ball check valve 23 in the chamber 22 and retained therein by a stop spider 24.

In order to facilitate the assembly of the filler block 10 in proper relation to the casing and to prevent any relative rotary movement between the block and the casing, the latter is provided with a segmental guide plate 25 which may be secured within the casing 3 in any convenient manner and the side edges of which engage the opposite walls 26ᵃ of a chamber 26 formed within the partition 11. Secured to the front or outer end of the shaft 18 is an arm 27 which may be connected in any suitable manner to the axle of a vehicle. The cover 14 is provided with a threaded opening 28ᵃ to receive a threaded plug 28.

The parts thus far described are substantially identical with parts of the shock absorber shown and described in my aforesaid prior application.

The partition 11 is provided at one side with a port 29 communicating at one end with the working chamber 12 and at its opposite end with the chamber 26, and an angular port 30 communicates at one end with the opposite side or end of the chamber 26 and at its opposite end with a chamber 31 having therein a ball check valve 32, the chamber 31 communicating with a segmental port 33 formed between the outer wall of the branch 11ᵃ of the partition and the adjacent wall of the casing, the said segmental port also communicating in turn at its narrowed remote end with a port 33ᵃ, to which reference will be made hereinafter in connection with the description of the thermostatically-controlled valve. The ports 29, 30 and 33 and the chambers 26 and 31 constitute a by-pass passageway for liquid from the impact end of the chamber 12 to the rebound end thereof.

The segmental partition 11 is also provided in the branch 11ᵃ thereof with an axially extending cylindrical bore 34 which is intersected by the port 33ᵃ and by a port 35 communicating with the chamber 26. In this bore are mounted two cylindrical sleeve members 36 and 37, which jointly form a sleeved guide for the thermostatically operated valve body, the front member 36 having at its rear end a wide slot 38 formed in the rear end thereof, the said slot communicating intermediate its ends with a longitudinal slot 38ᵃ, the said slots constituting a T-shaped port adapted to register more or less with the port 33ᵃ which is otherwise closed by the sleeve members 36 and 37. The sleeve member 36 is also provided with a port 39 which is adapted to register with the port 35; also with a port 40 near the front end thereof which communicates with the chamber 26.

Slidably mounted in the sleeve members 36 and 37 is a valve having cylindrical body portions 41 and 42 united by a stem 43 and providing therebetween an annular groove 44 adapted to register with the slots 38, 38ᵃ and the port 39. This valve is adapted and intended to be operated by a bimetal thermostat 45, which is preferably in the form of the letter U, having a long leg 45ᵃ and a short leg 45ᵇ. 46 denotes a stud which is threaded into a bore 47 in the cover 12ᵃ and the rear end of which projects into the chamber 26, being provided with a threaded rear end 46ᵃ, with an enlarged cylindrical portion 46ᵇ at the front of such end and with an outwardly extending annular seat 46ᶜ in front of the portion 46ᵇ. The shorter leg of the thermostat is provided with an opening adapted to fit about the portion 46ᵇ of the stud, and the thermostat is secured to said stud by means of a nut 48 and a washer 49. The washer, as shown in Figs. 7 and 8, is in the shape of the segment of a cylinder whereby, when flattened by setting up the nut 48, the thermostat is clamped firmly to the stud. After the nut shall have been so set up, the rear end of the stud may be upset, as shown at 46ᵈ, to lock the nut 48 in place. The front of the stud 46 projects through a stuffing-box chamber 49 having packing 50 therein, which packing is retained in place under pressure by means of an arched flat spring 51 having an offset central portion engaging the packing, while its rounded ends engage the cover plate 14. The front end of the stud 46 is reduced, as shown at 46ᵉ for the reception of a suitable socket wrench or other adjusting tool; and the cover 14 is provided with a plug 28 in line with the said stud. It will be evident that, by removing the plug 28, the thermostat 45 may be adjusted bodily in the chamber 26, should the occasion arise.

The opposite and longer leg 45ᵃ of the thermostat is connected to the valve 41–43 in such manner as to prevent any lateral binding between the valve and the interior of the guide sleeve members 36 and 37 as the valve is moved due to the expansion and contraction of the metals comprising the thermostat. In order to secure this result, the body portion 41 of the valve is provided with a socket 41ᵃ the rear end of which is peened around a ball 56ᵃ carried by a valve stem 56, as shown more particularly at 41ᵇ, Fig. 5. The valve stem 56 is provided with a thread, and the leg 45ᵃ of the thermostat is provided with a threaded aperture 45ᵇ for the reception of said stud. The rear end of the valve stem 56 is provided with a slot 56ᵇ for the reception of a screw driver or similar tool by means of which the relative positions of the thermostat leg 45ᵃ and the valve stem may be varied, the said leg being secured in any position to which it may be adjusted through rotation of the stud, by means of a nut 57. If necessary, the base 4 of the casing may be provided with a recess 4ᵃ to accommodate the movements of the valve stem 56. The valve stem 56, due to its pivotal connection with the valve, constitutes in effect a self-alining connection between the thermostat and the valve whereby lateral thrust of the valve against its guide sleeve is eliminated. The ports 33, 38, 38ᵃ, 35 and 29 and the chamber 26 constitute a valve-controlled by-pass passageway for liquid from the rebound end of the working chamber to the impact end thereof.

For the purpose of delivering into the replenishing chamber 13 any air that may tend to accumulate in the working chamber, I have provided the following construction:— 58 denotes a cylindrical plug mounted in the bore 59 which communicates at one end with the chamber 26 and at its opposite end, through a reduced extension 59ᵃ, with the chamber 13. The plug 58 is provided at one end with a restricted capillary bore 58ᵃ which communicates with the bore 59ᵃ. The bore 58ᵃ will permit the escape of air from the chamber 26 into the upper portion of the replenishing chamber 13, while practically preventing the discharge of liquid therethrough. In order to prevent clogging the capillary bore 58ᵃ, the end of the bore 59 which is adjacent to the chamber 26 is provided with a screen 60 of finer mesh than the diameter of the bore 58ᵃ, the screen being staked in place across the bore 59, as indicated at 60ᵃ.

In my prior application No. 422,519, filed January 22, 1930, there are shown, described and claimed the arrangement of the passage 33 and the ball check chamber 31 with reference to the valve which controls the by-pass of liquid on the rebound movement of the vane and which arrangement prevents disagreeable noise due to the seating of the ball check valve 32 as the vane 19 moves toward the leg or branch 11ᵃ of the partition. However, it has been found that a buzzing noise is apt to arise when the ball check valve is opened and engages the spider which retains it in the chamber 31, this buzzing noise being due to lateral vibration of the ball against the sides of the guide which insures the accurate seating of the ball at the adjacent end of the passage 30. Referring more particularly to Figs. 9 and 10, the guide employed for the ball is a triangular cage 61 of substantially the depth of the main portion of the chamber 31, the spider which retains the valve 32 in the said chamber being indicated at 62 and being shown as comprising arms 62ᵃ projecting from a central body, the arms being secured, as by staking, within the outer end of the chamber 31. By providing the spider 62ᵃ with a central opening 62ᵇ having its axis coincident with the axis of the adjacent portion of the passage 30, when the vane 19 moves away from the branch 11ᵃ of the partition, the ball will be moved outwardly and seat within the opening 62ᵇ, as shown in Fig. 10, whereby any lateral vibration of the same within the cage 61 will be avoided, with a consequent elimination of the buzzing sound referred to hereinbefore.

In the use of my thermostatic valve, the block 10, with the thermostatic valve assembly therein, is placed in a room having a temperature of 70° F. The stem 46 is first adjusted to bring the front surface of the annular seat 46ᶜ into engagement with the seat surrounding the bore 47, after which the stem is unscrewed about two complete turns, thereby to place the bottom of said portion 46ᶜ in a definite relation to such seat. When the assembly shall have reached the room temperature of 70° F., then the valve stem 56 is adjusted so that the portion 38ᵃ of the T-slot in the sleeve member 36 is about half uncovered. In practice, I have made the slot 38ᵃ $\frac{60}{1000}$ inch long by $\frac{30}{1000}$ inch in width, which will allow for a variation of 100° F. in the temperature to which the thermostat is subjected for the length of the slot; in other words, there will be $\frac{6}{1000}$ inch movement of the valve for every 10° variation in temperature to which the thermostat is subjected. However, it has been found that the viscosity of the liquid employed in hydraulic shock absorbers increases very much at low temperatures; hence the provision of the wide slot 38 with which the rear end of the slot 38ᵃ merges. By properly proportioning the slots 38ᵃ and 38, as well as by preventing any lateral binding between the valve body and the guide in which this body moves, I have been able to maintain a constant resistance to the flow of the liquid past the valve 41—43 throughout a wide temperature range.

By forming the ports 38ᵃ, 38 in one section of a composite sleeve, I am enabled, not only to make these ports very cheaply and conveniently, but, with a standard construction of block 10 (including a standard diameter of bore 34) I am enabled to provide for various models and makes of cars port areas which will insure substantially uniform resistance of the liquid in hydraulic shock absorbers throughout wide variations in temperature; all that is necessary in connection with any particular model of cars is to make the ports 38 and 38ᵃ in the sleeve member 36 of a capacity which will secure this uniform resistance for such model and to make the ports of the same size in all other sleeves used with cars of such model; there will be no occasion whatever for varying the construction of the block 10 or any of the other ports therein.

It will be noted that the pressure on opposite ends of the valve 41, 42 is completely balanced, the bottom of the portion 42 being exposed to the pressure of the liquid in the chamber 26 through the port 40, while a like area of the opposite end of the valve will be subjected to the pressure of liquid in said chamber, there being no reduction in area due to the use and manner of mounting the valve stem 56.

It will be obvious that, should occasion require, the position of the controlling portion 41 of the valve with reference to the ports 38, 38ª, may be readily varied by removing the plug 28 and adjusting the stud 46.

The operation of the device is as follows: when the piston or vane 19 is moved clockwise from the position shown in Fig. 3, the liquid will be forced through the port 29, chamber 26, angular port 30 past the ball check valve 32 and thence through the segmental port 33 to the opposite side of the piston. Upon movement of the piston in the opposite direction, the liquid will flow through the segmental port 33 and seat the valve 32 in the port or opening 30 and thence through the port 33ª, thence through the T-shaped port provided by the slots 38 and 38ª, thence through groove 44, thence through the port 39 to the chamber 26 and thence through the port 29 to the opposite side of the piston. The ports 33, 38, 38ª, 35 and 29 and the chamber 26 constitute a valve controlled by-pass or passageway through which the liquid from the working chamber passes. The flow of liquid through this passageway is regulated by the valve 41—43 which is connected with the thermostat 45 which is adjustably mounted within the chamber 26. The thermostat serves to regulate the flow of liquid through the passageway hereinbefore referred to in such a manner as to maintain resistance to the movement of the piston substantially constant irrespective of normal temperature changes.

It will now be clear that I have provided a hydraulic shock absorber and thermostatic control means therefor which will accomplish the objects of the invention hereinbefore stated.

Having thus described my invention, what I claim is:—

1. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, a slide valve for controlling the effective area of such passageway, a guideway for said valve, a thermostat subjected to the temperature of the liquid in said shock absorber, and a self-aligning connection between the said thermostat and the said valve whereby the valve may be moved freely in its guideway by said thermostat.

2. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, a guideway intersecting the said passageway, a slide valve in said guideway and adapted by its movements to vary the flow of liquid through said port, a thermostat subjected to the temperature of the liquid in said shock absorber, and a stem having a pivotal connection with said valve and connected to said thermostat.

3. A shock absorber comprising, in combination, a casing having a working chamber, a piston in said working chamber and movable toward and from walls defining the impact and rebound ends, respectively, of said chamber, there being a by-pass communicating through one of said walls with the impact end of said working chamber and through the other wall of said chamber with the rebound end of such working chamber, a cylindrical guideway intersecting the said passageway, a valve having a cylindrical portion mounted in said guideway and adapted by its movements to vary the effective area of said passageway, a stem pivotally connected to said valve, and a looped thermostat subjected to the temperature of the liquid in the said shock absorber and having one end adjustably connected to said stem.

4. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, a guideway intersecting the said passageway, a valve having a portion mounted in said guideway and adapted by its movements to vary the effective area of said passageway, a stem movably connected to said valve, and a thermostat subjected to the temperature of the liquid in the said shock absorber and having one end connected to said stem.

5. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, there being a cylindrical bore intersecting the said passageway, a sleeve in said bore having inlet and outlet ports, a valve in said sleeve having a cylindrical portion adapted to control the inlet port, and a thermostat subjected to the temperature of the liquid of the shock absorber and connected to said valve.

6. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, there being a bore intersecting the said passageway, a sleeve in said bore having inlet and outlet ports, a valve in said sleeve having a portion adapted to control the inlet port, and a thermostat subjected to the temperature of the liquid of the shock absorber and connected to said valve.

7. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, there being a bore intersecting the said passageway, a sleeve in said bore also intersecting said passageway and having a substantially T-shaped inlet port and also provided with an outlet port, a valve slidably mounted within said sleeve and having a body portion adapted to control the effective area of the inlet port by movement in the direction of the stem portion of such port, and a thermostat subjected to the temperature of the liquid in the shock absorber and connected with said valve.

8. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, there being a cylindrical bore intersecting the said passageway, a cylindrical sleeve member in said bore also intersecting said passageway and having an inlet port extending into the body of the sleeve from one end thereof and also provided with an outlet port, a valve slidably mounted within said sleeve member and having a cylindrical body portion and adapted to control the effective area of the inlet port, and a thermostat subjected to the temperature of the liquid in the shock absorber and connected with said valve.

9. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such chamber, there being a bore intersecting the said passageway, a sleeve member in said bore also intersecting said passageway and having an inlet port extending into the body of the said member from one end thereof and also provided with an outlet port, a second sleeve member abutting the end of the first sleeve member which is provided with the inlet port, a valve having a portion adapted to engage the inner surfaces of said sleeve members respectively, and a thermostat subjected to the temperature of the liquid in the shock absorber and connected to said valve.

10. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, there being a cylindrical bore intersecting the said passageway, a cylindrical sleeve member in said bore also intersecting said passageway and having an inlet port extending into the body of the said member from one end thereof and also provided with an outlet port, a second cylindrical sleeve member abutting the end of the first sleeve member which is provided with the inlet port, a valve comprising spaced cylindrical portions adapted to engage the inner surfaces of said sleeve members respectively and an intermediate reduced portion adapted to form an annular passage through said sleeve between the inlet and the outlet ports thereof, and a thermostat subjected to the temperature of the liquid in the shock absorber and connected to said valve.

11. A shock absorber comprising, in combination, a casing having a working chamber therein, a piston in said working chamber movable toward and from walls defining opposite ends of said chamber, there being a chamber provided between such walls and located intermediate of the ends of the first mentioned chamber, a port communicating with one end of the working chamber and with such intermediate chamber and a port communicating with the opposite end of the working chamber and with such intermediate chamber, a sliding valve controlling one of the aforesaid ports, a looped thermostat located in the intermediate chamber, and a self-aligning connection between one leg of the said thermostat and the said valve.

12. A shock absorber comprising, in combination, a casing having a working chamber therein, a piston in said working chamber movable toward and from walls defining opposite ends of said chamber, there being a chamber provided between such walls and located intermediate of the ends of the first mentioned chamber, a port communicating with one end of the working chamber and with such intermediate chamber and a port communicating with the opposite end of the working chamber and with such intermediate chamber, a sliding valve controlling one of the aforesaid ports, a looped thermostat located in the intermediate chamber, a self-aligning connection between one leg of the said thermostat and the said valve, and means for adjusting the thermostat bodily in the direction of the longitudinal axis of said valve.

13. A shock absorber comprising, in combination, a casing having a working chamber therein, a piston in said working chamber movable toward and from walls defining opposite ends of said chamber, there being a chamber provided between such walls and located intermediate of the ends of the first mentioned chamber, a port communicating with one end of the working chamber and with such intermediate chamber and a port communicating with the opposite end of the working chamber and with such intermediate chamber, a guide-way intersecting one of said ports and provided with angularly spaced inlet and outlet ports, a valve body mounted in said guideway and adapted by its movement to control the effective area of the inlet port, a looped thermostat located in said intermediate chamber, a self-aligning connection between one leg of the said loop and the said valve, a stem connected with the opposite leg of said loop and arranged substantially parallel with the direction of movement of said valve, and means for adjusting the said stem thereby to vary the position of the said valve with reference to the said inlet port.

14. A shock absorber comprising, in combination, a cylindrical casing having a working chamber therein, a partition in said casing having a chamber therein, a shaft in said casing and a vane carried by said shaft and movable toward and from said partition; a cover for said chambers, a cover for said casing and a replenishing chamber between said covers, there being a port communicating with one end of the working chamber and with such intermediate chamber and a port communicating with the opposite end of the working chamber and with such intermediate chamber, a sliding valve controlling the effective area of one of said ports, a looped thermostat in the intermediate chamber, a connection between one leg of the thermostat and the said valve, a stud threaded in the first mentioned cover and extending into the intermediate chamber and connected with the other leg of the said thermostat, the said stud having an operating end located in the replenishing chamber, the cover for the replenishing chamber having an opening, and a plug for said opening whereby access may be had to the said stud for adjusting the same.

15. A shock absorber comprising, in combination, a cylindrical casing having a working chamber therein, a partition in said casing having a chamber therein, a shaft in said casing and a vane carried by said shaft and movable toward and from said partition, a cover for said chambers, a cover for said casing and a replenishing chamber between said covers, there being a port communicating with one end of the working chamber and with such intermediate chamber and a port communicating with the opposite end of the working chamber and with such intermediate chamber, a sliding valve controlling the effective area of one of said ports, a looped thermostat in the intermediate chamber having a long leg and a short leg, a self-aligning connection between the long leg of the thermostat and the said valve, a stud threaded in the first mentioned cover and extending into the intermediate chamber and connected with the short leg of the said thermostat, the said stud having an operating end located in the replenishing chamber, the cover for the replenishing chamber having an opening, and a plug for said opening whereby access may be had to the said stud for adjusting the same.

16. A shock absorber comprising, in combination, a cylindrical casing having a working chamber therein, a partition in said casing having a chamber therein, a shaft in said casing and a vane carried by said shaft and movable toward and from said partition, a cover for said chambers, a cover for said casing and a replenishing chamber between said covers, there being a port communicating with one end of the working chamber and with such intermediate chamber and a port communicating with the opposite end of the working chamber and with such intermediate chamber, a sliding valve controlling the effective area of one of said ports, a looped thermostat in the intermediate chamber having a connection between one of the legs of the thermostat and the said valve, a stud threaded in the first-mentioned cover and extending into the intermediate chamber and connected with the other leg of the said thermostat, the first mentioned cover having a stuffing box surrounding the said stud and opening into the replenishing chamber, packing material for said stuffing box, a spring mounted on the end of said stud in the replenishing chamber and bearing at its center against the packing and having ends engaging the cover for the casing and the replenishing chamber, the last mentioned cover having an opening registering with the said stud, and a plug for said opening.

17. A shock absorber comprising, in combination, a casing having a working chamber, a piston in said working chamber and movable toward and from walls defining the impact and rebound ends, respectively, of said chamber, there being a by-pass passageway communicating through one of said walls with the impact end of said working chamber and through the other wall of said chamber with the rebound end of such working chamber, a guideway intersecting the said passageway, a slide valve in said guideway and adapted by its movements to vary the flow of liquid through said port, a thermostat subjected to the temperature of the liquid in said shock absorber, a stem having a movable connection with said valve and connected to said thermostat, and means for balancing the pressure of the liquid on opposite ends of said valve.

In testimony whereof, I hereunto affix my signature.

EUGENE L. BEECHER.